United States Patent [19]

Iino et al.

[11] Patent Number: 4,711,544
[45] Date of Patent: Dec. 8, 1987

[54] DISPLAY SYSTEM FOR VEHICLE

[75] Inventors: Tadashi Iino; Yoshikazu Nagashima; Masaya Sugita, all of Susono, Japan

[73] Assignee: Yazaki Corporation, Tokyo, Japan

[21] Appl. No.: 850,126

[22] Filed: Apr. 10, 1986

[30] Foreign Application Priority Data

| Apr. 12, 1985 | [JP] | Japan | 60-53550[U] |
| Sep. 11, 1985 | [JP] | Japan | 60-138013[U] |
| Sep. 11, 1985 | [JP] | Japan | 60-138014[U] |
| Oct. 18, 1985 | [JP] | Japan | 60-158724[U] |
| Oct. 25, 1985 | [JP] | Japan | 60-162966[U] |
| Oct. 25, 1985 | [JP] | Japan | 60-237634 |
| Nov. 29, 1985 | [JP] | Japan | 60-182951[U] |
| Mar. 12, 1986 | [JP] | Japan | 61-34577[U] |

[51] Int. Cl.$^4$ .................................. G03B 21/00
[52] U.S. Cl. .................................. 353/14; 353/98; 353/69
[58] Field of Search .............. 353/13, 11, 12, 14, 353/98, 69, 70; 350/174

[56] References Cited

U.S. PATENT DOCUMENTS

| 1,259,711 | 3/1918 | Allison | 353/70 |
| 2,017,634 | 10/1935 | Newcomer | 353/98 X |
| 2,641,159 | 6/1953 | Halakis | 353/14 |
| 3,182,550 | 5/1965 | Goldine | 353/13 |
| 3,339,203 | 8/1967 | Curry et al. | 350/174 X |
| 3,887,273 | 6/1975 | Griffiths | 353/14 |
| 3,915,548 | 10/1975 | Opittek et al. | 350/174 X |

FOREIGN PATENT DOCUMENTS

| 899009 | 12/1953 | Fed. Rep. of Germany | 353/14 |
| 50-48576 | 5/1975 | Japan . | |
| 541155 | 11/1941 | United Kingdom | 353/29 |

Primary Examiner—Harry N. Haroian
Attorney, Agent, or Firm—Murray and Whisenhunt

[57] ABSTRACT

A display system according to the present invention is provided with a projective display unit for projecting a display image of a display device which displays various data, onto a front glass of the vehicle and forming a virtual image of the display image in front of the front glass, and a position adjusting means for adjusting the position of the virtual image formed in front of the front glass by shifting a projective optical axis of the display image extending to the front glass, whereby the whole surface of the front glass in front of the driver can be utilized as a display image projection surface and hence the virtual image of the display image can be formed in a desired position aligned with the line of vision of the driver without obstructing the front sight of the driver.

18 Claims, 20 Drawing Figures

DISPLAY SYSTEM FOR VEHICLE

BACKGROUND OF THE INVENTION

The present invention relates to a vehicular display system mounted on a vehicle such as an automobile and more particularly to a vehicular display system for displaying data concerning a vehicle such as vehicle speed, engine revolutions, time and various warnings.

As a display system of this type there has heretofore been known such a display system as disclosed in Japanese Utility Model Laid-Open Publication No. 48576/75, which is shown in FIG. 1. In this known display system, a projective display unit (not shown) comprising a lens, a display device disposed within the focus of the lens and a case which houses those components therein, is mounted inside an instrument panel 1b located in front of a steering wheel 1a of a vehicle 1, and on a dash board 1c located in front of the instrument panel 1b is disposed a half mirror at a predetermined angle relative to the above lens, the half mirror 2 having predetermined transmissivity and reflectivity. A display image which represents a data concerning the vehicle such as, for example, vehicle speed displayed on the above display device is projected on the half mirror 2 through an opening 1d formed in the dash board 1c, whereby a virtual image 3 is formed at a predetermind distance ahead of the half mirror 2.

Consequently, the driver on the driver's seat sees the virtual image 3 in an overlapped state with the external sight and thus can obtain data required for driving without taking his eyes off the external sight, thereby permitting a safe driving of the vehicle.

By the way, the vehicle driving is performed by drivers of various constitutions or having various habits, so the line of vision for the outside greatly differs depending on drivers during vehicular driving. In this case, by making pivotable a mounting base end of the half mirror 2 onto the dash board 1c, the half mirror 2 can be adjusted to a suitable position, that is, the position of the virtual image 3 can be moved up and down for alignment with the line of vision of the driver.

However, the movable range of the virtual image 3 is restricted by the size of the half mirror 2, so where it is to cover all drivers, it becomes necessary to use the half mirror 2 having a correspondingly larger area.

But, if the half mirror 2 is made very large, the greater part of the driver's front sight will be covered with the same mirror, thus resulting in that the driver sees the front through the half mirror 2. Although the half mirror 2 is a see-through mirror, it is apparent that this mirror will be a hindrance to the driver's front sight. Besides, it exerts a bad influence upon the design of the instrument panel 1b and obstructs wiping of a front glass 1e behind the panel. Additionally, there is a serious problem also from the aspect of safety because an upper edge of the half mirror 2 faces the driver's side.

The present invention has been accomplished in order to solve the above-mentioned problems.

SUMMARY OF THE INVENTION

Accordingly, it is the object of the present invention to provide a vehicular display system capable of freely changing the position of display within the driver's front sight.

The vehicular display system provided for attaining the above object includes a projective display means mounted on a vehicle, the projective display means having a display device for displaying various data and functioning to project a display image of the display device onto a vehicular front glass and form a virtual image of the display image in front of the front glass; and also includes a position adjusting means for adjusting the position of the virtual image formed in front of the front glass by shifting a projective optical axis of the display image extending from the projective display means to the front glass.

In the above vehicular display system of the present invention, since the display image is projected on the front glass, it is not necessary to provide any special member on this side of the front glass, that is, the driver's front sight is not obstructed, and thus the display system is superior in safety, appearance and design. Further, since the position of the display image projected on the front glass can be adjusted, it is possible to form a virtual image of the display image in the most suitable position aligned with the line of vision of the driver according to the constitution and posture of each driver.

DETAILED DESCRIPTION OF THE EMBODIMENTS

The present invention will be described in detail hereinunder with reference to the accompanying drawings.

Figure 1:
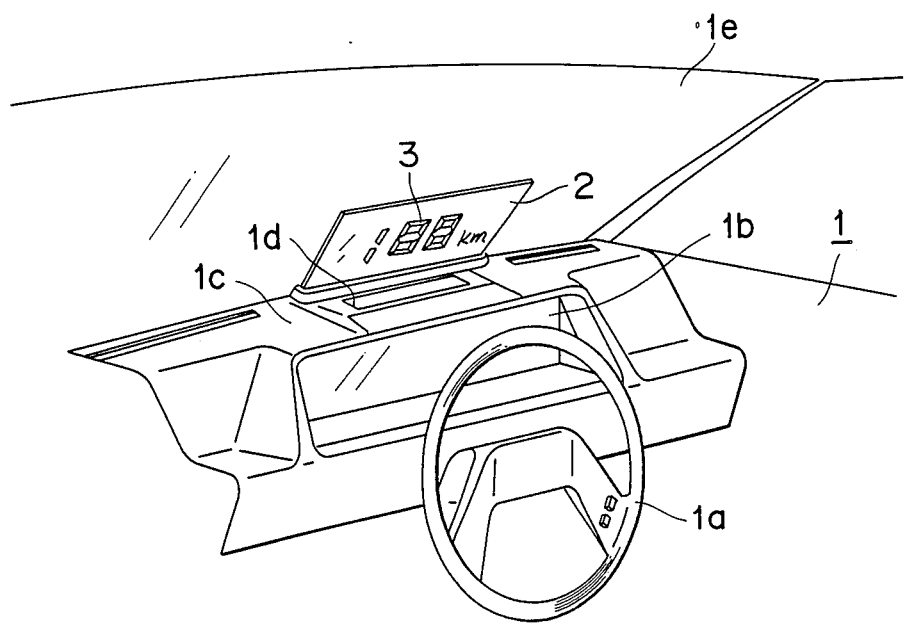
FIG. 1 is a perspective view showing an example of a conventional vehicular display system.
Figure 2:
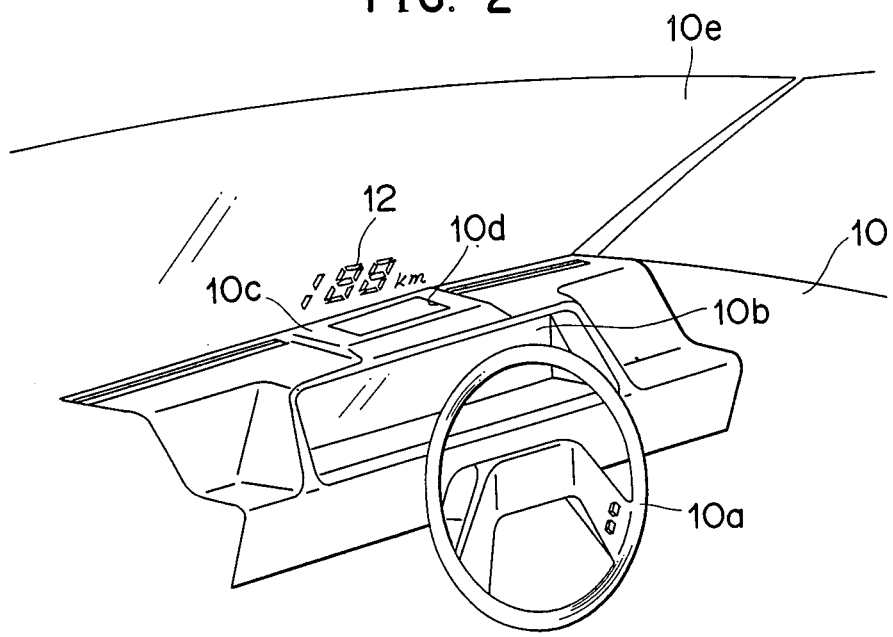
FIG. 2 is a perspective view of a vehicular display system according to an embodiment of the present invention.
Figure 3:
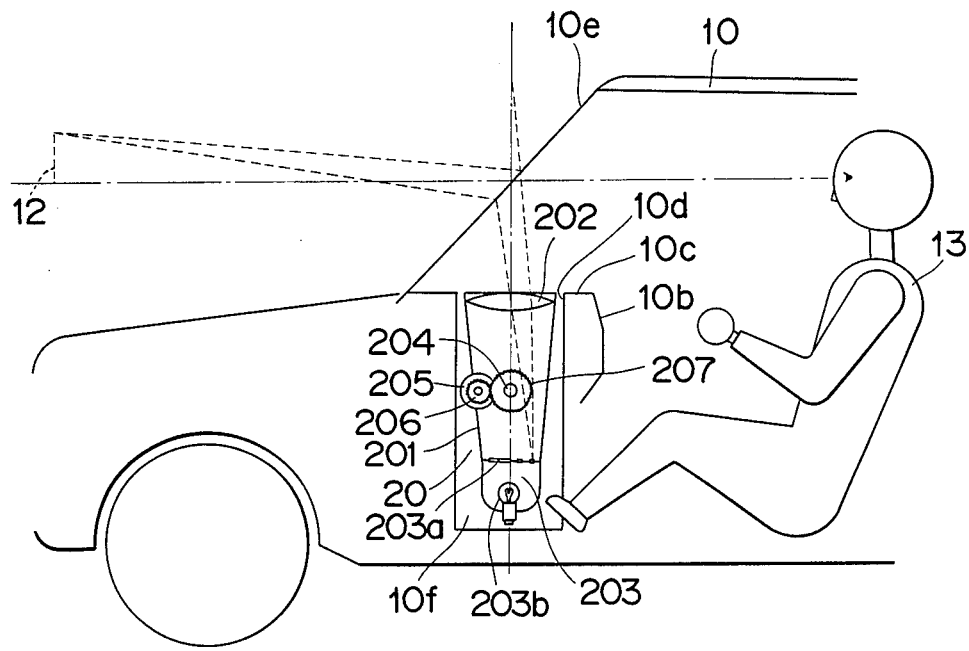
FIG. 3 is a sectional view showing details of the display system of FIG. 2.
Figure 4:
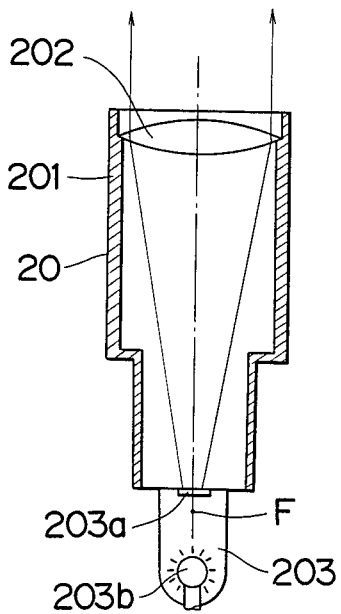
FIG. 4 is a sectional view showing details of a projective display unit in FIG. 3.

Referring to FIGS. 2 to 4, there is illustrated a vehicular display system embodying the present invention, in which a later-described projective display unit 20 is mounted inside an instrument panel 10b which is located in front of a steering wheel 10a of a vehicle 10. The projective display unit 20 projects a display image onto an inner surface of a front glass 10e located above a dash board 10c, through an opening 10d of the dash board and images the display image in front of the front glass 10e, as a virtual image 12.

The projective display unit 20 comprises a housing 201, a convex lens 202 as an optical system disposed in an opening at one end of the housing 201, and a display device 203 disposed at the bottom of the housing 201. As shown in FIG. 4, the display device 203 is constituted by a light transmission type liquid crystal display device comprising a liquid crystal display (LCD) cell 203a disposed inside a focus F of the convex lens 202, namely, in a position closer to the convex lens 202 than the focus F and a light source 203b, the light source 203b being a lamp which emits light to the LCD cell 203a from a rear face of the cell.

The LCD cell 203a which is driven by a display driver (not shown), forms a display image which represents data concerning the vehicle, e.g. vehicle speed. The display image is a negative or positive image which selectively permits or does not permit the light applied to the rear face of the LCD cell 203a from the light source 203b to pass therethrough. The light which has passed through the LCD cell 203a in the form of the display image is projected onto the front glass 10e through the convex lens 202, whereby a virtual image 12 of the display image is formed in front of the front glass 10e.

An outer wall of the housing 201 of the projective display unit 20 is provided with a rotating shaft 204 for supporting the projective display unit 20 rotatably in a space 10f which is formed inside the instrument panel 10b. Mounted on the rotating shaft 204 is a gear 207 meshing with a gear 206 which is fixed to a rotational shaft of an electric motor 205, the motor 205 being also disposed in the space 10f. The rotating shaft 204, motor 205 and gears 206, 207 constitute a rotation support mechanism for the projective display unit 20, which support mechanism permits the projective display unit 20 to rotate along with the rotating shaft 204 when the motor 205 is rotated forward or reverse selectively by operation of an adjusting knob mounted, for example, on the instrument panel 10b and serving as an operating means.

Figure 5:
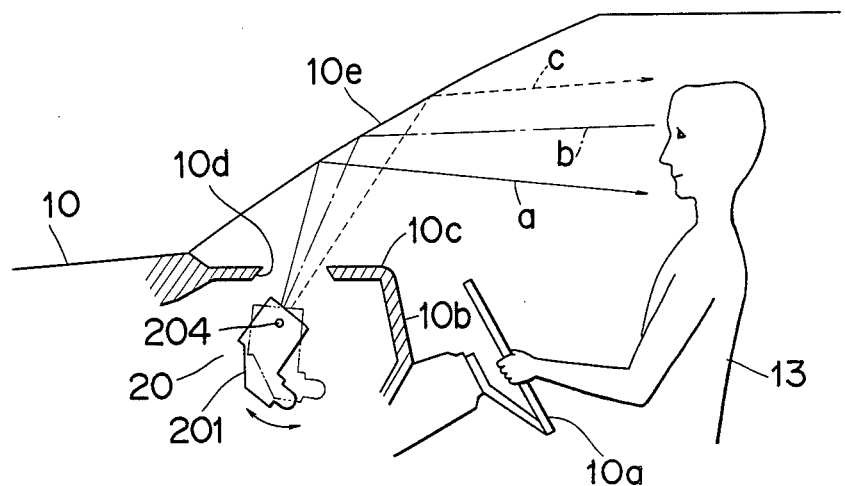
FIG. 5 is an explanatory view of the operation of the display system, shown in FIG. 3.

In the above construction, the driver can see the virtual image 12 of the display image projected on the front glass 10e, in an overlapped condition with the external sight. In the case where the position of the virtual image 12 is not in alignment with the line of vision of the driver, the motor 205 is rotated forward or reverse by operation of the above adjusting knob to rotate the projective display unit 20 along with the rotating shaft 204 as shown in FIG. 5. With this rotation of the projective display unit 20, a projective optical axis of the display image onto the front glass 10e from the projective display unit 20 is changed, whereby the direction of reflected light from the front glass 10e is changed as indicated by arrows a, b and c, thus permitting the virtual image 12 to be formed in a desired position aligned with the line of vision of the driver.

Figure 6:
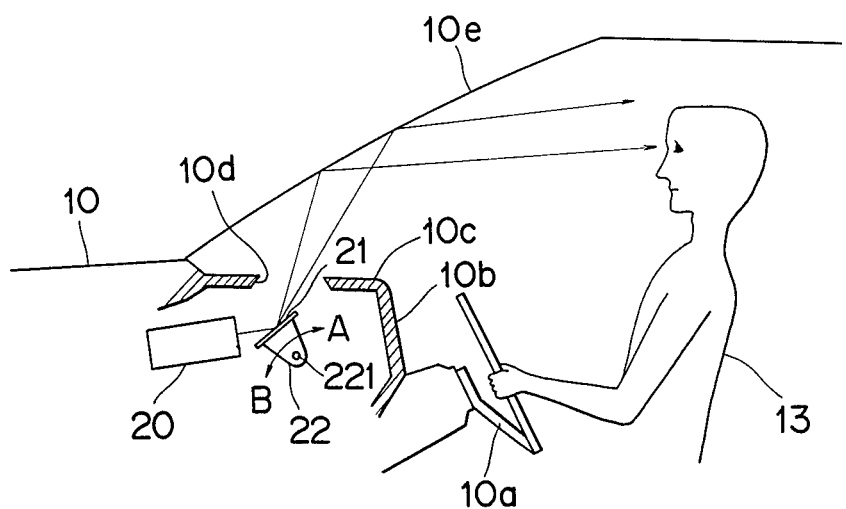
FIG. 6 is a partially sectional view of a vehicular display system according to another embodiment of the present invention.

Referring now to FIG. 6, there is illustrated a vehicular display system according to another embodiment of the present invention, in which a display image of the projective display unit 20 is reflected by a reflecting mirror 21 and projected onto the front glass 10e, the reflecting unit 21 being disposed inside the instrument panel 10b together with the projective display unit 20. The reflecting mirror 21 is supported rotatably by a rotation support mechanism 22, to which is transmitted a rotating power from a drive source through a rotation transfer mechanism (not shown), whereby the reflecting mirror 21 is rotated in the direction of arrow A or B following a rotating shaft 221. With this rotation of the reflecting mirror 21 in the direction of arrow A or B, the projected position of the display image is moved up or down on the front glass 10e.

In this embodiment of FIG. 6, the reflecting mirror 21, which is smaller in weight and size than the projective display unit 20, is rotated to change the position of projection, so in comparison with the structure in which the projective display unit 20 is driven, the load to the motor as the drive source is small, permitting the use of a smaller-size motor. At the same time, the area of the space 10f in the instrument panel 10b can also be reduced.

Figure 7:
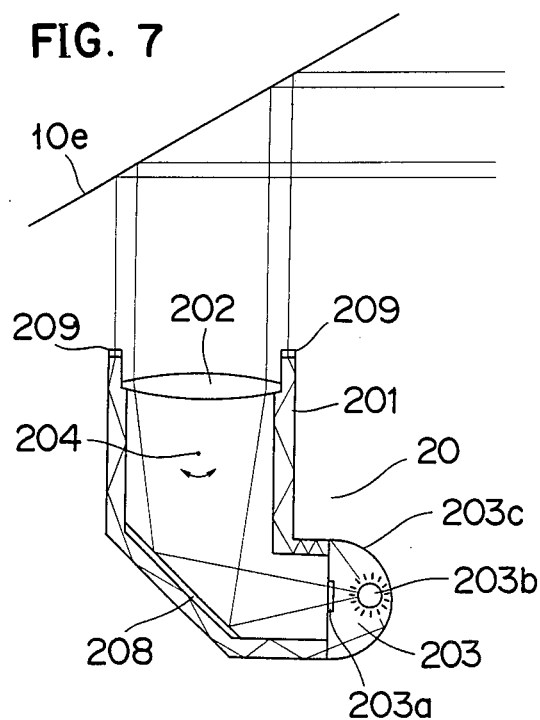
FIGS. 7 and 8 are a sectional side view and a partially broken-away perspective view, respectively, showing a modified example of a projective display unit used in the display system of the invention.
Figure 8:
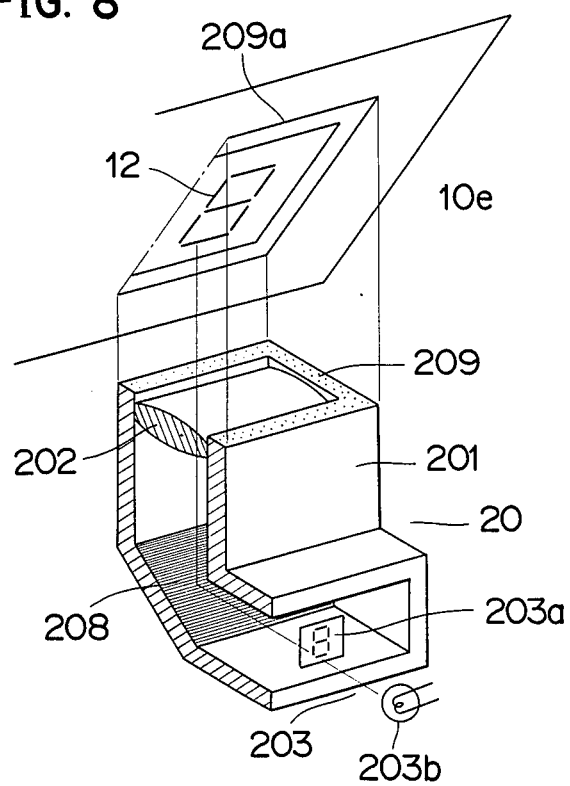

Referring now to FIGS. 7 and 8, there is illustrated a vehicular display system according to a further embodiment of the present invention, in which a housing 201 of the projective display unit 20 is formed generally in L shape from a transparent synthetic resin material such as acrylic resin or polycarbonate resin. To a base end portion of the housing 201 is attached a display device 203 comprising an LCD cell 203a, a light source 203b and a light source case 203c which houses the light source 203b therein and which reflects and condenses light emitted from the light source. Further, a reflecting mirror 208 is fixed to a central bent portion of the housing 201, and a convex lens 202 is mounted in an opening portion of the housing 201. Around the opening portion is provided a display element 209 formed by a coating of fluorescent paint for example.

In such construction, a display image of the display device 203 is reflected by the reflecting mirror 208 and projected onto the front glass 10e through the convex lens 202. Part of the light emitted from the light source 203b is incident on the housing 201 from the base end face of the housing and reaches an end face of the opening portion while being conducted through the interior of the housing, thereby illuminating the fluorescent coating as the display element 209 from the rear face thereof, whereby the frame shape of the opening end face of the housing 201 is projected on the front glass 10e and a display frame image 209a is formed around the virtual image 12 of the display image.

When the projective display unit 20 is rotated along with the rotating shaft 204 for changing the position of projection of the display image of the display device 203 onto the front glass 10e, for example, at the time of change of the driver, the display frame image 209a also shifts on the front glass 10e. Therefore, even if there is no display on the display device 203, the driver can know the position in which the virtual image 12 of the display image is to be formed, upon his seeing of the display frame image 209a.

As mentioned above, since the reflecting mirror 208 is provided between the display device 203 and the objective lens 202 and an optical path reaching the convex lens 202 from the display device 203 is bent, the convex lens 202 has a long focal distance, and even when the display device 203 must be disposed away from the convex lens 202, the overall length of the projective display unit 20 is short, thus permitting a construction of a compact shape.

In the embodiment illustrated, the light from the light source 203b is conducted to the rear face of the display element 209, but when the surroundings are light, the display frame image 209a can be formed by the reflection of ambient light made by the fluorescent coating of the display element 209. Alternatively, light from a light source provided separately from the light source 203b may be conducted to the rear face of the display element 209.

Figure 9:
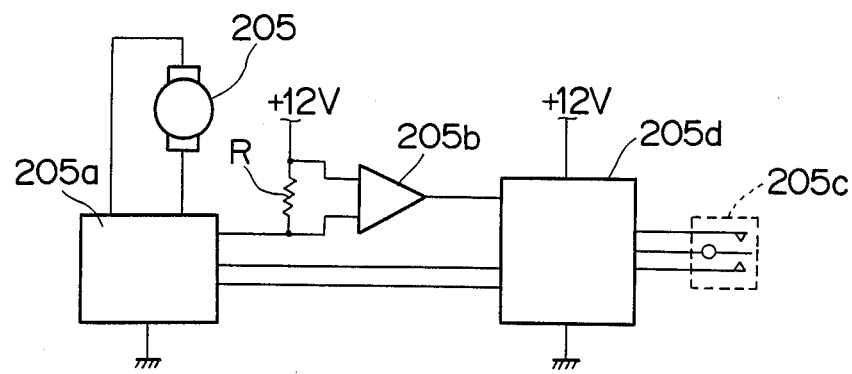
FIG. 9 illustrates a control circuit for a motor which drives the projective display unit in FIG. 3 and a reflecting mirror in FIG. 6.

Referring now to FIG. 9, there is illustrated a control circuit for an electric motor 205 for rotating the projection display unit 20 or the reflecting mirror 21, in which circuit the motor 205 is driven by a motor driver 205a. An electric current consumed during operation of the motor is detected by a detecting resistor R, while an overcurrent in a limit position and a dash current at the time of start-up of the motor are discriminated from each other by means of a limit position detecting circuit 205b which is constituted by a comparator. Then, a motor controller 205d controls the motor driver 205a in accordance with the result of the discrimination and the state of an operating switch 205c which functions to set the rotation of the motor 205 forwardly and reversely.

Figure 10:
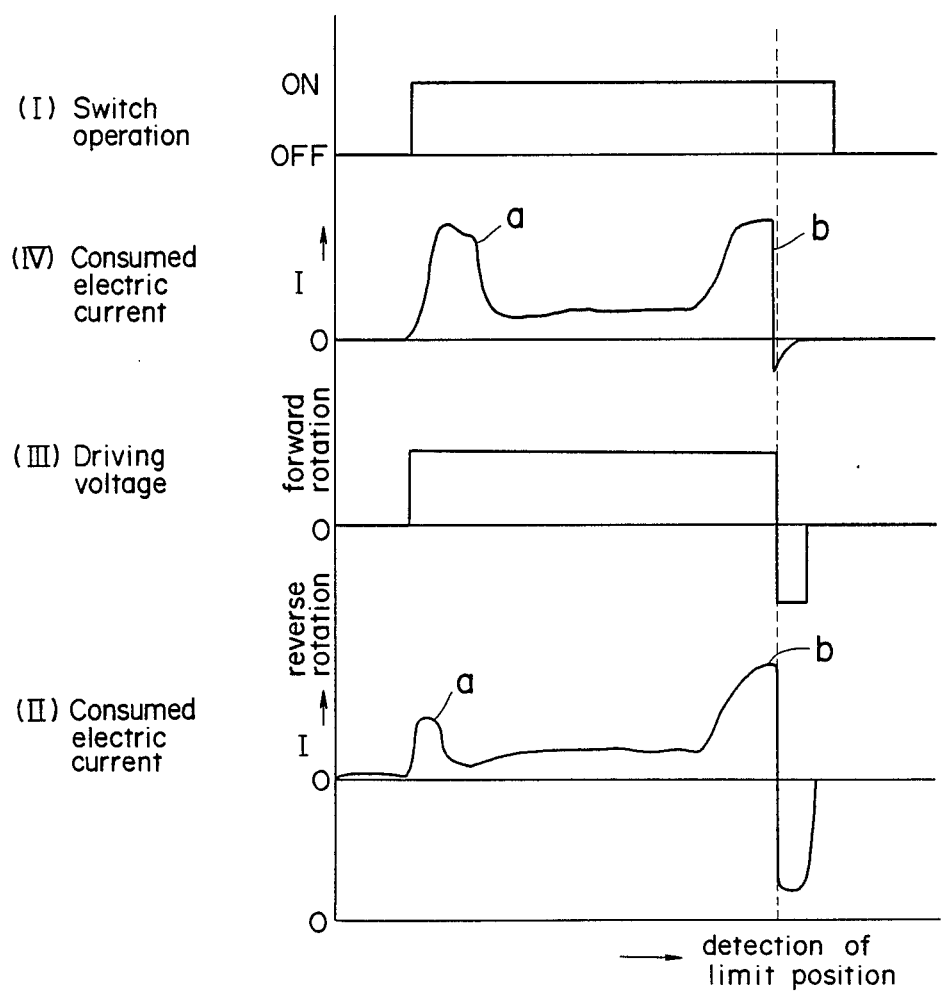
FIG. 10 is a time chart for explaining the operation of the circuit shown in FIG. 9.

The range of rotation of the projective display unit 20 and that of the reflecting mirror 21 are each restricted by a stopper (not shown) so as not to exceed a predetermined range. Therefore, if the switch 205c is so operated as to rotate the projective display unit 20 or the reflecting mirror 21 in excess of the predetermined range as shown in FIG. 10(I), the motor 205 becomes overloaded in the limit position and such an overcurrent as indicated by b in FIG. 10(II) flows in the detecting resistor R. Then, a voltage developed across the resistor R by the said overcurrent is detected by the limit position detecting circuit 205b, which in turn provides a signal to the motor controller 205d, whereupon the motor controller 205d outputs, for a predetermined time period, a driving voltage of a polarity opposite to that of the driving voltage so far provided, to rotate the motor 205 in the reverse direction.

Thus, by rotating the motor 205 reversely for a certain period of time upon exceeding of the limit position, a dash current ["a" in FIG. 10(II)] at the time of start-up in the reverse rotation of the motor 205 is much smaller than that indicated by "a" in FIG. 10(IV) which is detected when the motor 205 is stopped immediately in the limit position, and it is obviously of a magnitude different from that of the overcurrent in the limit position. As a result of such reduction of the start-up dash current, the limit position detecting circuit 205b is prevented from being operated erroneously by the dash current.

Figure 11:
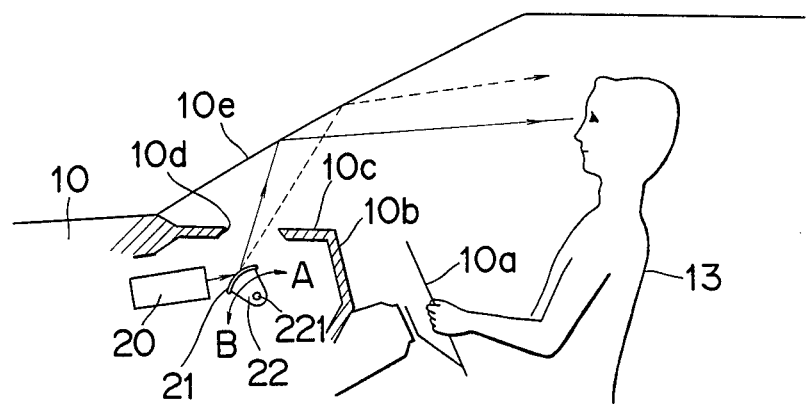
FIG. 11 is a partially sectional view showing a modification of the display system of FIG. 6.

Referring now to FIG. 11, there is illustrated a modification of the display system described above in connection with FIG. 6, in which a reflecting mirror 21 supported rotatably by the rotation support mechanism 22 serves not only as means for changing the projective position of a display image but also as means for correcting the distortion of a virtual image of the display image caused by a curvature of the front glass 10e. To this end, the reflecting mirror 21 is formed in a shape having a reflection characteristic completely reverse to that of the front glass 10e.

In general, the front glass 10e is curved in an advancing direction of the vehicle. The virtual image 12 formed by projecting the display image onto such a shape of the front glass 10e will be seen in a distorted form along the shape of the front glass 10. The amount of the distortion is large particularly when the projection of the display image is effected from the assistant driver's seat side onto the front glass portion just in front of the driver's seat.

However, as shown in FIG. 11, where the light from the projective display unit 20 is projected onto the front glass 10e through the reflecting mirror 21, the display image is once distorted by the reflection characteristic of the reflecting mirror 21 and thereafter distorted reversely by the front glass 10e which has a reflection characteristic opposite to that of the reflecting mirror 21, so that the virtual image formed in front of the front glass 10e is a distortion-corrected image.

Figure 12:
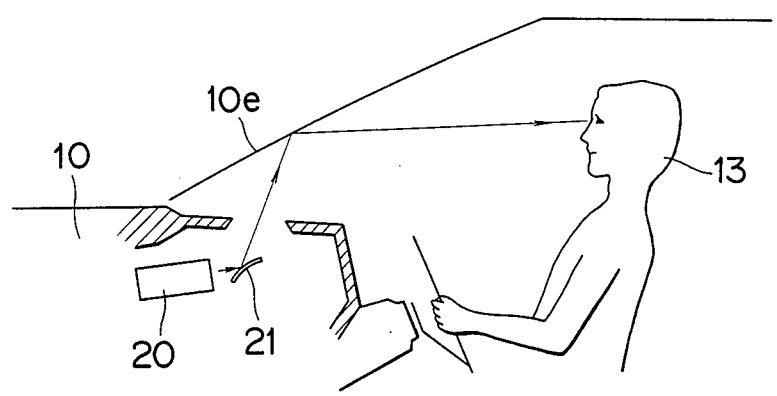
FIG. 12 is a partially sectional view showing a modification of the display system of FIG. 3.

FIG. 12 illustrates a modification of the display system shown in FIG. 3 with the projective display unit 20 being rotatable. In the display system of FIG. 12, a distortion of image caused by the curvature of the front glass 10e is corrected by a fixed reflecting mirror 21' which is disposed in proximity to the projective display unit 20.

Figure 13:
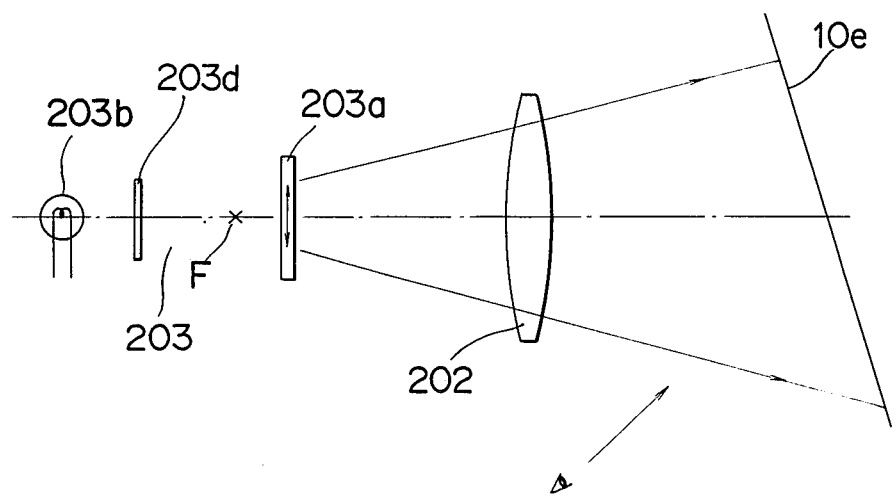
FIGS. 13 to 15 schematically illustrate further examples of projective display units used in the display system of the invention.
Figure 14:
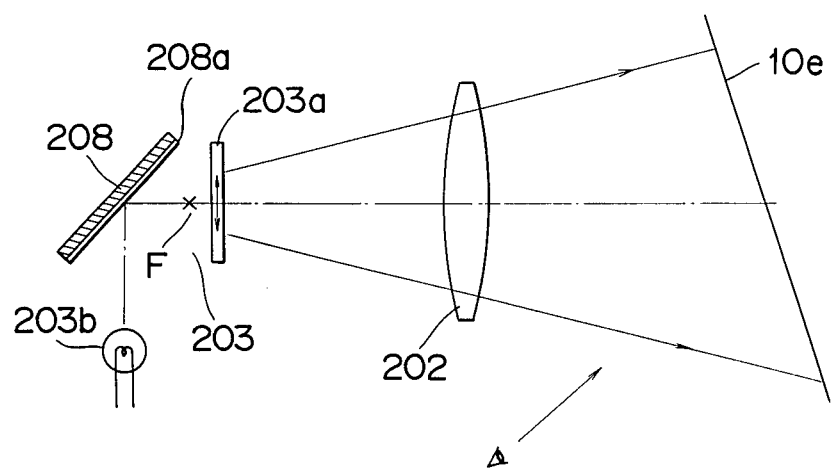
Figure 15:
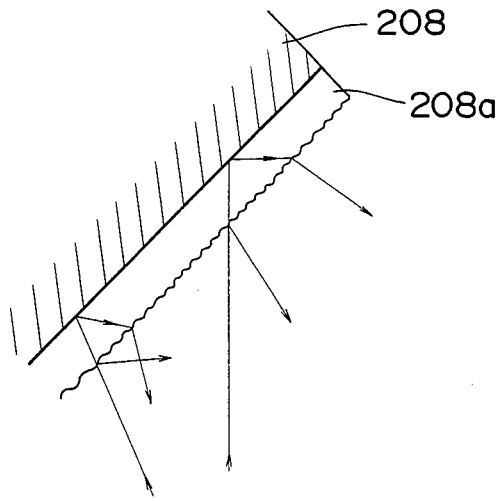

FIGS. 13 to 15 illustrate other preferred examples of projective display units 20 in which a display device 203 is constituted by a transmission type liquid crystal display device.

In FIG. 13, a diffusion plate 203d is disposed in a position between a light source 203b and an LCD cell 203a, sufficiently spaced from a focus F of an objective lens 202 and outside the focus F. In this arrangement, the light from the light source 203b is diffused and uniformly distributed by the diffusion plate 203d and in this state it is incident on the LCD cell 203a, so that there is obtained a display image of a small luminance difference, and a spot reflection on the diffusion plate 203d is not projected in an enlarged state through the objective lens 202, thus affording an image free from glare and capable of being seen clearly.

In FIG. 14, in the projective display unit 20 using the reflecting mirror 208 which has been described in connection with FIGS. 7 and 8, a diffusion plate 208a formed from a light transmissible material is stuck to the reflection surface of the reflecting mirror 208. In this construction, as shown in FIG. 15, the light from the light source 203b is partially reflected irregularly by the surface of the diffusion plate 208a, while the remaining portion of the light which has passed through the diffusion plate 208a is wholly reflected by a reflecting mirror surface formed at the rear face of the diffusion plate 208a and then reflected irregularly when passing through the diffusion plate 208a again. Consequently, the effect of diffusion is improved remarkably as compared with the case where the diffusion plate alone is used. Besides, since the whole of the light incident on the diffusion plate 208a from the light source 203b is reflected irregularly and applied to the LCD cell 203a there is obtained a sufficiently light display image without loss of the light.

Referring now to FIGS. 16 to 19, there is illustrated a preferred example of a light transmission type liquid crystal display device, in which an LCD cell 203a of a display device 203 is composed of a display cell 203a-1, a negative-positive change-over cell 203a-2 and a polarizing plate 203a-3, and it is connected to a display driver 32 which receives a signal indicative of a vehicle speed from a vehicle speed sensor 30. The display device 203 further includes a light source 203b which is composed of a high luminance light source 203b-1, a low luminance light source 203b-2 and a light source case 203b-3 which houses those light sources therein. The high and low luminance light sources 203b-1 and 203b-2 are separated from each other by means of a half mirror 203a-4 within the light source case 203b-3 so that the light from the high luminance light source 203b-1 which has been reflected by the half mirror 203b-4 and the light from the low luminance light source 203b-2 which has passed through the half mirror 203b-4 are applied selectively to the rear face of the LCD cell 203a.

Further, a negative-positive change-over switch 34 is provided between the negative-positive change-over cell 203a-2 and the display driver 32, while a light source change-over switch 36 is provided between the high luminance light source 203b-1 and the low luminance light source 203b-2. These two change-over switches 34 and 36 are changed over from one to the other interlockedly with a lighting switch 38 for lamps such as clearance lamps which are turned ON during the night.

Further, between the high luminance light source 203b-1 and the half mirror 203b-4 there is disposed a transparent heat reflecting filter 203b-5 for preventing the influence of heat upon the LCD cell 203a.

Figure 16:
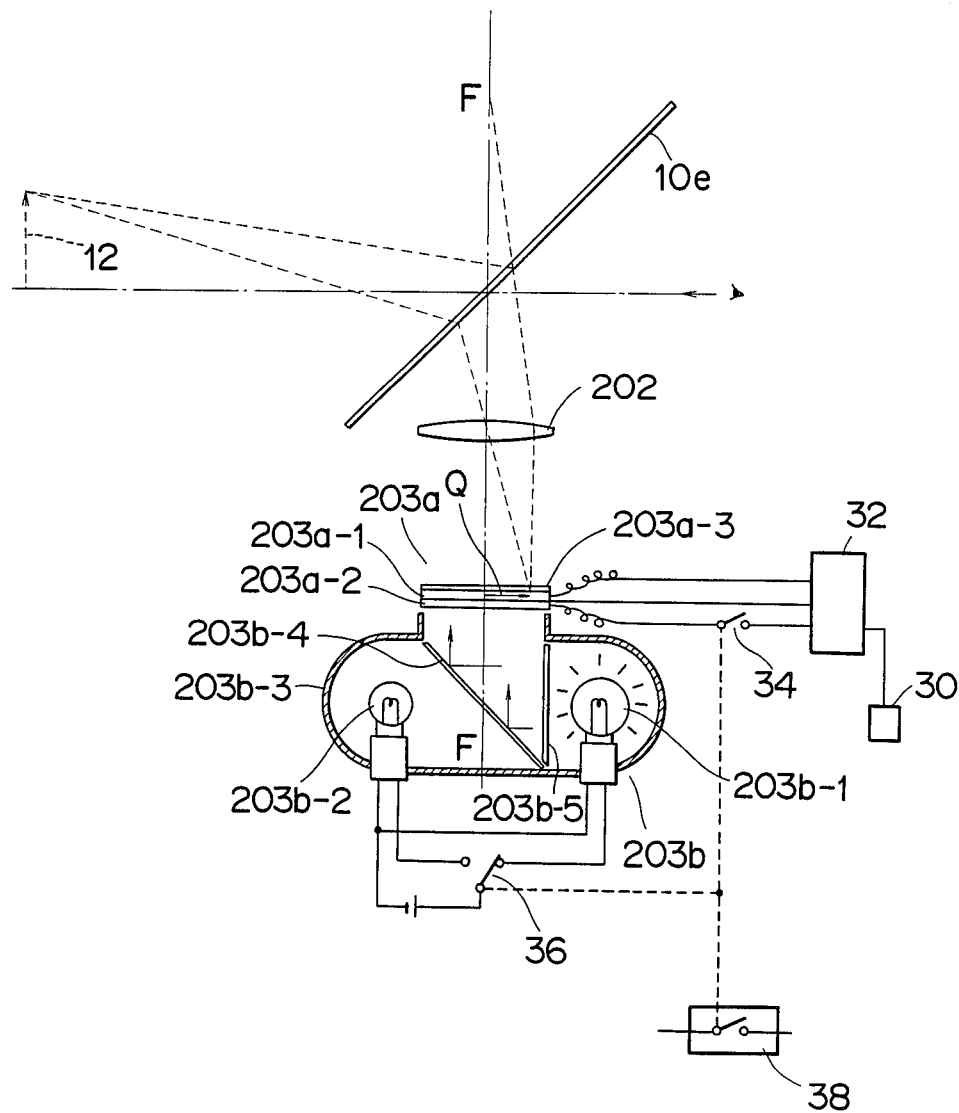
FIGS. 16 to 19 illustrate an example of a display device in the projective display unit used in the display system of the invention.
Figure 17:
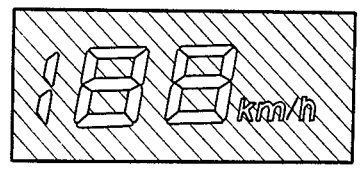

In the above construction, during the daytime in which the surroundings are light, the lighting switch 38 is OFF as shown in FIG. 16 and the change-over switches 34 and 36 interlocked therewith are in such states as shown in the figure. In this condition, the display driver 32 forms a display image Q on the display cell 203a-1 of the LCD cell 203a in accordance with a signal provided from the vehicle speed sensor 30. In this connection, the polarizing direction of the polarizing plate 203a-1 is selected so that the virtual image 12 of the display image Q in front of the front glass 10e becomes such a negative display as shown in FIG. 17.

Simultaneously with the formation of the display image in the display cell 203a-1, the high luminance light source 203b-1 is turned ON. The light from the high luminance light source 203b-1 is reflected and condensed by the inner surface of the light source case 203b-3 and is incident on the half mirror 203b-4 which is mounted inclinedly at 45°. The half mirror 203b-4 reflects the incident light onto the rear face of the LCD cell 203a. The light thus incident on the LCD cell 203a passes through the LCD cell 203a in the form of a display image of the display cell 203a-1 and is projected on the front glass 10e through the convex lens 202, whereby a virtual image 12 of such a negative display as shown in FIG. 17 is formed in front of the front glass 10e.

Figures 18, 19:
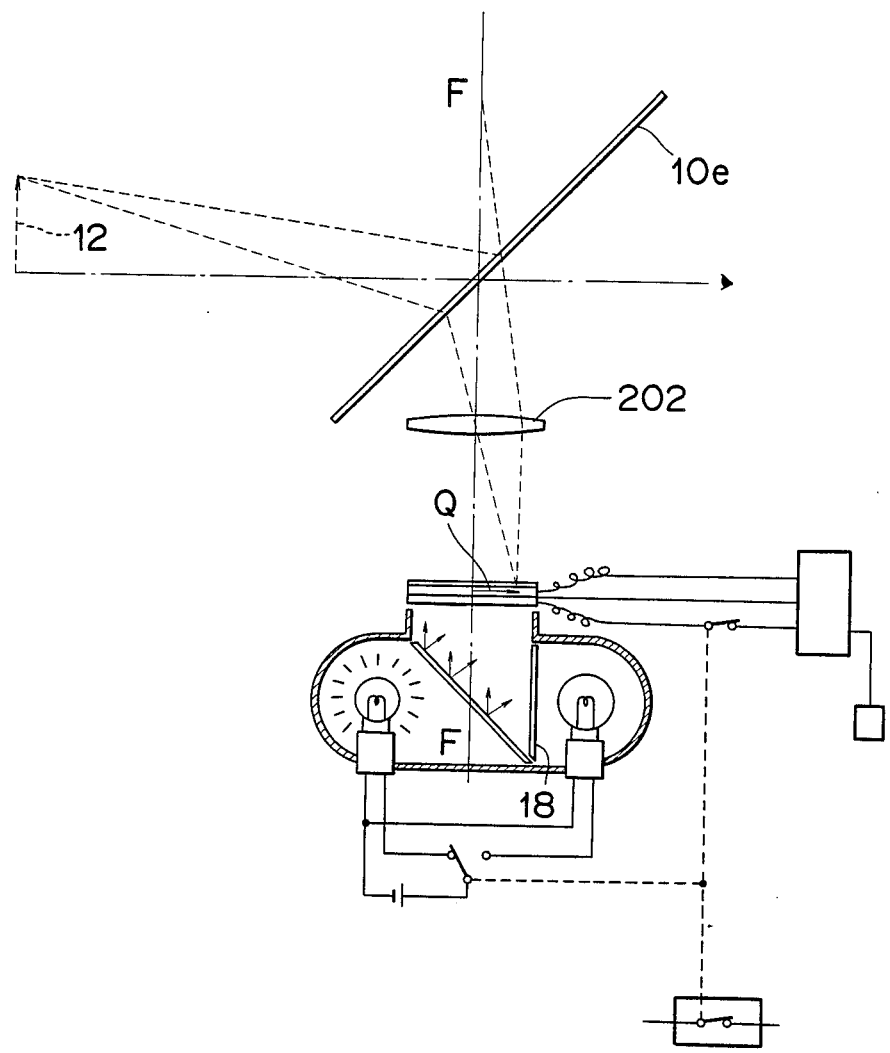

On the other hand, during the night in which the surroundings are dark, the lighting switch 34 is turned ON as shown in FIG. 18, and when the change-over switches 34 and 36 assume the state shown interlockedly therewith, the low luminance light source 203b-2 is turned ON and a virtual image 12 of such a positive display as shown in FIG. 19 is formed in front of the front glass 10e by the action of the negative-positive change-over cell 203a-2.

Upon turning ON of the high luminance light source 203b-1, a strong infrared ray is developed, but it is prevented from reaching the LCD cell 203a by the transparent heat reflecting filter 203b-5, so a thermal breakage of the LCD cell 203a can be prevented.

Figure 20:
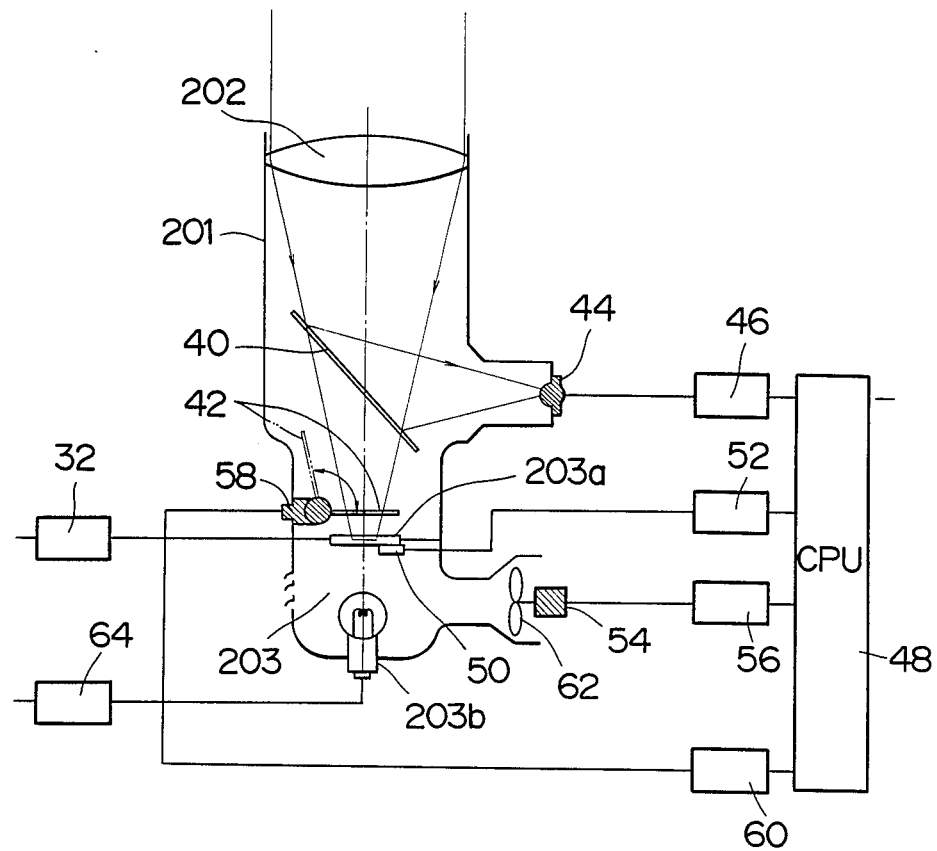
FIG. 20 illustrates a still further example of a projective display unit used in the display system of the invention.

Referring now to FIG. 20, there is illustrated a further preferred example of a projective display unit 20, in which a half mirror 40 is mounted at a predetermined angle between a convex lens 202 and a display device 203, and a shutter 42 is disposed rotatably between the half mirror 40 and the display device 203.

A portion of the sunlight which is incident from the exterior of the projective display unit 20 through the convex lens 202, is detected by a light detecting element 44, which in turn provides a signal of a magnitude proportional to the intensity of the external light. This signal is converted to a digital signal by means of an analog-digital (A-D) converter, which digital signal is fed to a control circuit 48 which is constituted by a microcomputer (CPU).

On the other hand, a temperature detecting element 50 is mounted near an LCD cell 203a of the display device 203 and an output signal from the temperature detecting element 50 is also fed to the control circuit 48 through an A-D converter 52. In accordance with the signals provided from the detecting elements 44 and 50, the control circuit 48 provides control signals to a blower drive controller 56 which controls a blower driver 54 and also to a shutter drive controller 60 which controls a shutter driver 58.

The shutter driver 58 drives the shutter 42 which is normally closed, in an opening direction. The blower driver 54 drives a blower 62 disposed near a light source 203b.

The convex lens 202, half mirror 40, shutter 42 and display device 203 are housed in a housing 201, the housing 201 having a ventilating hole 201a provided near the light source 203b of the display device 203. Numeral 32 denotes a display driver for driving the LCD cell 203a of the display device 203 to form a display image and numeral 64 denotes a light source driver for turning ON the light source 203b.

In the above construction, when the sunlight is incident on an optical axis of the projective display unit 20, a portion of the incident light is reflected by the half mirror 40 and detected by the light detecting element 44. The light detecting element 44 provides a signal proportional to the magnitude of the detected light, which signal is fed to the control circuit 48 through the A-D converter 46. The control circuit 48 makes a discrimination on the signal provided from the light detecting element 44 and detects whether an external light of a level above a predetermined level has been incident or not. When an incidence of such an external light is detected by the control circuit 48, this control circuit provides a signal to the shutter drive controller 60. In accordance with the signal from the control circuit 48 the shutter drive controller 60 causes the shutter driver 58 to close the shutter 42 which is open, so that the sunlight is shielded by the shutter 42, whereby the LCD cell 203a is prevented from being damaged under the irradiation heat of the sunlight.

On the other hand, a radiant heat from the light source 203b is detected by the temperature detecting element 50, which in turn provides a signal to the control circuit 48 through the A-D converter 52. In accordance with an input signal of a level above the predetermined level the control circuit 48 provides a signal to the blower drive controller 56, which in turn causes the blower driver 54 to operate the blower 62 in accordance with the signal from the control circuit 48. Upon operation of the blower 62, the surroundings of the light source 203b are ventilated to prevent the rise in temperature of the surface of the LCD cell 203a.

What is claimed is:

1. A display for a vehicle, said system conprising:

a projective display means mounted on the vehicle and having a display device for displaying data, said projective display means functioning to project a display image of said display device onto a front glass of the vehicle, thereby forming a virtual image of said display image in front of said front glass, said projective display means having a rotatably supported housing for housing said display device, and a rotational axis on which said housing is mounted, said rotational axis extending through said housing, said projective display means further having an optical system for projecting said display image of said display device onto said front glass, said display device being disposed within a focus of said optical system;

a position adjusting means for adjusting the position of said virtual image formed in front of said front glass by shifting a projective optical axis from said projective display means to said front glass, said position adjusting means having an electric motor for rotating said housing about said rotational axis, a projective display position of said display image onto said front glass being changed upon rotation of said housing about said rotational axis by said electric motor;

an external light detecting means for detecting an external light incident from the exterior through said optical system, said external light detecting means outputting an electrical signal proportional to the magnitude of the external light; and a preventing means for preventing an external light from being incident on said display device through said optical system when the level of the external light incident through said optical system is above a predetermined value, in accordance with the electrical signal provided from said external light detecting means.

2. A display system according to claim 1, wherein said housing has an opening for projecting said display image of said display device onto said front glass, and wherein a display element is provided in said opening for projecting on said front glass a projective position indicating image which indicates the position of said display image projected on said front glass.

3. A display system according to claim 2, wherein said display element is provided along an edge portion of said opening to form a frame-like projective position indicating image which surrounds said virtual image of said display image formed in front of said front glass.

4. A display system for a vehicle, said system comprising:

a projective display means mounted on the vehicle and having a display device for displaying data, said projective display means functioning to project a display image of said display device onto a front glass of the vehicle, thereby forming a virtual image of said display image in front of said front glass, said projective display means having a rotatably supported reflecting member which reflects said display image to project it onto said front glass, and a rotational axis on which said reflecting member is mounted, said rotational axis extending through said reflecting member, said projective display means further having an optical system for projecting said display image of said display device onto said front glass, said display device being disposed within a focus of said optical system;

a position adjusting means for adjusting the position of said virtual image formed in front of said front glass by shifting a projective optical axis from said projective display means to said front glass, said position adjusting means having an electric motor for rotating said reflecting member about said rotational axis, a projective display position of said display image onto said front glass being changed with rotation of said reflecting member about said rotational axis by said electric motor;

an external light detecting means for detecting an external light incident from the exterior through said optical system, said external light detecting means outputting an electrical signal proportional to the magnitude of the external light; and a preventing means for preventing an external light from being incident on said display device through said optical system when the level of the external light incident through said optical system is above a predetermined value, in accordance with the electrical signal provided from said external light detecting means.

5. A display system according to claim 1, and further including a display element for projecting on said front glass a projective position indicating image which indicates the position of the display image projected from said projective display means onto said front glass, the position of the projective position indicating image projected from said display element onto said front glass being changed with the movement of said projective optical axis effected by said position adjusting means.

6. A display system according to claim 1, wherein said position adjusting means includes:

an operating member which indicates a shifting direction of the projective optical axis of the display image;

an electric motor for shifting the projective optical axis of the display image;

a restriction member for restricting a shifting range of the projective optical axis;

a limit position detecting means which detects a limit position of said shifting range on the basis of an electric current flowing in said electric motor; and a control means which drives said electric motor in a direction opposite to the previous direction for a predetermined period of time in response to the detection of the limit position effected by said limit position detecting means.

7. A display system according to claim 1, wherein said projective display means is further provided with a reflecting mirror disposed between said display device and said optical system for reflecting the display image of said display device to project it onto said front glass through the optical system.

8. A display system according to claim 1, wherein said preventing means is constituted by a shutter plate disposed between said optical system and said display device.

9. A display system according to claim 1, wherein said external light detecting means comprises:

a half mirror inclined at a predetermined angle between said optical system and said display device; and a light detecting element which receives a portion of the external light incident from the exterior through said optical system and reflected by said half mirror, said light detecting element outputting an electrical signal proportional to the magnitude of the external light.

10. A display system according to claim 1, wherein said display device is a light transmission type display device comprising a liquid crystal display cell and a light source which emits light so that the light is incident from a rear face of said liquid crystal display cell.

11. A display system according to claim 10, wherein said liquid crystal display cell effects a negative or positive display selectively.

12. A display system according to claim 10, wherein said light source comprises two light sources, one being for a high luminance and the other for a low luminance, and said display device further includes a change-over switch for selecting one of said two light sources.

13. A display system according to claim 12, wherein said change-over switch is interlocked with a lighting switch of the vehicle to select the light source for a high luminance when said lighting switch is ON.

14. A display system according to claim 10, wherein said display device further includes a heat protecting means for preventing a rise in temperature of said liquid crystal display cell induced by the heat generated from said light source.

15. A display system according to claim 1, wherein said projective display means is further provided with an optical system for projecting said display image of said display device onto said front glass, and said display device is a light transmission type display device comprising a liquid crystal display cell disposed within a focus of said optical system and a light source which emits light so that the light is incident from a rear face of said liquid crystal display cell.

16. A display system according to claim 15, wherein said display device is disposed between said liquid crystal display cell and said light soruce and is further provided with a diffusion plate for diffusing the light from said light source toward the rear of said liquid crystal display cell, said diffusion plate being formed from a light transmissible material.

17. A display system according to claim 15, wherein said dispaly device is further provided with a reflecting mirror disposed between said liquid crystal display cell and said light source for reflecting the light from said light source toward the rear face of said liquid crystal display cell and a disffusion plate adhered to a reflection surface of said reflecting mirror, said diffusion plate being formed from a light transmissible material.

18. A display system for a vehicle, said system comprising:

a projective display means mounted on the vehicle and having a display device for displaying data, said projective display means functioning to project a display image of said display device onto a front glass of the vehicle, thereby forming a virtual image of said display image in front of said front glass, said front glass having a curvature, said projective display means further having a rotatably supported reflecting member which reflects said display image of said display device to project it onto said front glass, and a rotational axis on which said reflecting member is mounted, said rotational axis extending through said reflecting member;

a position adjusting means for adjusting the position of said virtual image formed in front of said front glass by shifting a projective optical axis from said projective display means to said front glass, said position adjusting means having an electric motor for rotating said reflecting member about said rotational axis, a projective display position of said display image onto said front glass being changed with rotation of said reflecting member about said rotational axis by said electric motor; and a distortion correcting means for correcting a distortion of said virtual image of said display image caused by the curvature of said front glass, said distortion correcting means including a reflecting mirror having a reflection characteristic opposite to that based on the curvature of said front glass, said reflecting mirror functioning to reflect said display image of said display device in said projective display device to project said display image onto said front glass.

* * * * *